US009275293B2

(12) United States Patent
Broache et al.

(10) Patent No.: US 9,275,293 B2
(45) Date of Patent: Mar. 1, 2016

(54) AUTOMATED OBJECT IDENTIFICATION AND PROCESSING BASED ON DIGITAL IMAGING AND PHYSICAL ATTRIBUTES

(71) Applicant: Thrift Recycling Management, Inc., Livermore, CA (US)

(72) Inventors: Gary Broache, Queenstown, MD (US); Julian Van Erlach, Irving, TX (US); Ben Chandler, Toledo, OH (US); Marcus Ouimet, Abbotsford (CA); Kirby Knapp, Severna Park, MD (US)

(73) Assignee: Thrift Recycling Management, Inc., Baltimore, MD (US)

( * ) Notice: Subject to any disclaimer, the term of this patent is extended or adjusted under 35 U.S.C. 154(b) by 0 days.

(21) Appl. No.: 14/634,013

(22) Filed: Feb. 27, 2015

(65) Prior Publication Data
US 2015/0248589 A1  Sep. 3, 2015

Related U.S. Application Data

(60) Provisional application No. 61/966,634, filed on Feb. 28, 2014.

(51) Int. Cl.
*G06K 9/18* (2006.01)
*G06K 9/62* (2006.01)
*G06K 9/46* (2006.01)
*G06Q 10/08* (2012.01)

(52) U.S. Cl.
CPC ............... *G06K 9/18* (2013.01); *G06K 9/4604* (2013.01); *G06K 9/6215* (2013.01); *G06Q 10/08* (2013.01); *G06K 2209/19* (2013.01)

(58) Field of Classification Search
None
See application file for complete search history.

(56) References Cited

U.S. PATENT DOCUMENTS

| | | | |
|---|---|---|---|
| 5,397,004 A | 3/1995 | Kaiser et al. | |
| 6,705,528 B2 | 3/2004 | Good et al. | |
| 6,915,954 B2 | 7/2005 | Knowles et al. | |
| 6,923,374 B2 | 8/2005 | Knowles et al. | |
| 6,988,661 B2 | 1/2006 | Tsikos et al. | |
| 7,152,795 B2 | 12/2006 | Tsikos et al. | |
| 7,177,444 B2 | 2/2007 | Bonner et al. | |
| 7,182,259 B2 | 2/2007 | Lubow et al. | |
| 7,449,655 B2 | 11/2008 | Cowling et al. | |
| 7,997,417 B2 | 8/2011 | Saether | |
| 8,019,118 B2 | 9/2011 | Sternberg et al. | |
| 8,234,006 B1 | 7/2012 | Sachar et al. | |
| 8,407,110 B1 | 3/2013 | Joseph et al. | |
| 8,413,903 B1 * | 4/2013 | Dhua et al. | 235/462.25 |
| 2006/0043174 A1 * | 3/2006 | Banavar | G06K 7/0008 235/383 |
| 2011/0178633 A1 * | 7/2011 | Marrese et al. | 700/229 |
| 2011/0245965 A1 | 10/2011 | Farrell | |
| 2012/0106787 A1 * | 5/2012 | Nechiporenko | G06K 9/00 382/103 |
| 2013/0013537 A1 | 1/2013 | Rujan et al. | |

FOREIGN PATENT DOCUMENTS

WO  WO0103047  1/2001

* cited by examiner

*Primary Examiner* — Sumati Lefkowitz
*Assistant Examiner* — Ryan P Potts

(57) ABSTRACT

A method and associated systems for object identification and subsequent processing based on digital imaging and physical attributes. An object-identification system receives, in a materials-handling environment, a digital image and physical attributes that characterize an unidentified object. An attempt is made to identify the object by matching the image and attributes to those of known objects stored in an image database, an attribute database, or another external source. The object is associated with a label that identifies the actual object, associates the object with a similar object that may be substituted for the actual object in a desired application, or designates the object as unidentifiable. The digital image, label, and external sources used to identify the object may be updated by associating them with metadata gathered during the identification process. Subsequent processing is governed by business rules that operate as functions of the label data.

21 Claims, 3 Drawing Sheets

AUTOMATED OBJECT IDENTIFICATION AND PROCESSING BASED ON DIGITAL IMAGING AND PHYSICAL ATTRIBUTES

TECHNICAL FIELD

The present invention relates to the field of control systems for automated production lines. More specifically, it relates to automatically identifying an unidentified object on such a production line as a function of a digital image of the object or of a physical attribute of the object, and then processing the object as a function of that identification.

BACKGROUND

Modern inventory-control, billing, distribution, and other types of similar systems identify an item of merchandise by means of a machine-readable label affixed to the item. Such a label might show a combination of one or more bar codes, QR (Quick Response) codes, alphanumeric strings, graphics, or other identifiers that allows a reading device to identify information from which a characteristic of the labeled item may be retrieved or inferred.

Some items are so labeled upon manufacture or prior to being shipped to a distribution channel. Others, however, are not labeled or are labeled in a manner that does not facilitate identification by a machine-reading mechanism. In some cases, a sales, distribution, or other facility might use a machine-readable method, but that method may not be fully compatible with a particular type of labeling mechanism used on a particular item.

There is thus a need for a way to automatically identify, classify, and label items that are either unlabeled or labeled in a manner that is incompatible with a particular labeling format, medium, or identification mechanism.

BRIEF SUMMARY

A first embodiment of the present invention provides a computerized object-identification system comprising a processor, a memory coupled to the processor, an interface to an imaging device, a set of interfaces to a set of electronic sensors, and a computer-readable hardware storage device coupled to the processor, the storage device containing program code configured to be run by the processor via the memory to implement a method for automated object identification and processing based on at least one of a digital image of an object and a physical attribute of the object, the method comprising:

the computerized object-identification system receiving notice that the object has not been identified;

the system receiving information that describes an unidentified object;

the system identifying the object as a function of the received information;

the system further identifying a set of related objects as a further function of the received information;

the system ranking the related objects as a function of a value of a correlated characteristic of the unidentified object;

the system, at a time after the receiving notice, directing a labeling device to generate a unique machine-readable species label that associates the unidentified object with at least one species of object selected from a group comprising: an actual species of the unidentified object, a default species that indicates that the object cannot be identified, and a species of the highest-ranked related object; and the system directing that the species label be affixed to the unidentified object such that a downstream business rule may determine how the object should be processed as a function of the species identified by the species label.

A second embodiment of the present invention provides a method for automated object identification and processing based on at least one of a digital image of an object and a physical attribute of the object, the method comprising:

a computerized object-identification system receiving notice that the object has not been identified;

the system receiving information that describes an unidentified object;

the system identifying the object as a function of the received information;

the system further identifying a set of related objects as a further function of the received information;

the system ranking the related objects as a function of a value of a correlated characteristic of the unidentified object;

the system, at a time after the receiving notice, directing a labeling device to generate a unique machine-readable species label that associates the unidentified object with at least one species of object selected from a group comprising: an actual species of the unidentified object, a default species that indicates that the object cannot be identified, and a species of the highest-ranked related object; and the system directing that the species label be affixed to the unidentified object such that a downstream business rule may determine how the object should be processed as a function of the species identified by the species label.

A third embodiment of the present invention provides a computer program product, comprising a computer-readable hardware storage device having a computer-readable program code stored therein, the program code configured to be executed by a computerized object-identification system comprising a processor, a memory coupled to the processor, an interface to an imaging device, a set of interfaces to a set of electronic sensors, and a computer-readable hardware storage device coupled to the processor, the storage device containing program code configured to be run by the processor via the memory to implement a method for automated object identification and processing based on at least one of a digital image of an object and a physical attribute of the object, the method comprising:

the computerized object-identification system receiving notice that the object has not been identified;

the system receiving information that describes an unidentified object;

the system identifying the object as a function of the received information;

the system further identifying a set of related objects as a further function of the received information;

the system ranking the related objects as a function of a value of a correlated characteristic of the unidentified object;

the system, at a time after the receiving notice, directing a labeling device to generate a unique machine-readable species label that associates the unidentified object with at least one species of object selected from a group comprising: an actual species of the unidentified object, a default species that indicates that the object cannot be identified, and a species of the highest-ranked related object; and the system directing that the species label be affixed to the unidentified object such that a downstream business rule may determine how the object should be processed as a function of the species identified by the species label.

DETAILED DESCRIPTION

Figure 1:
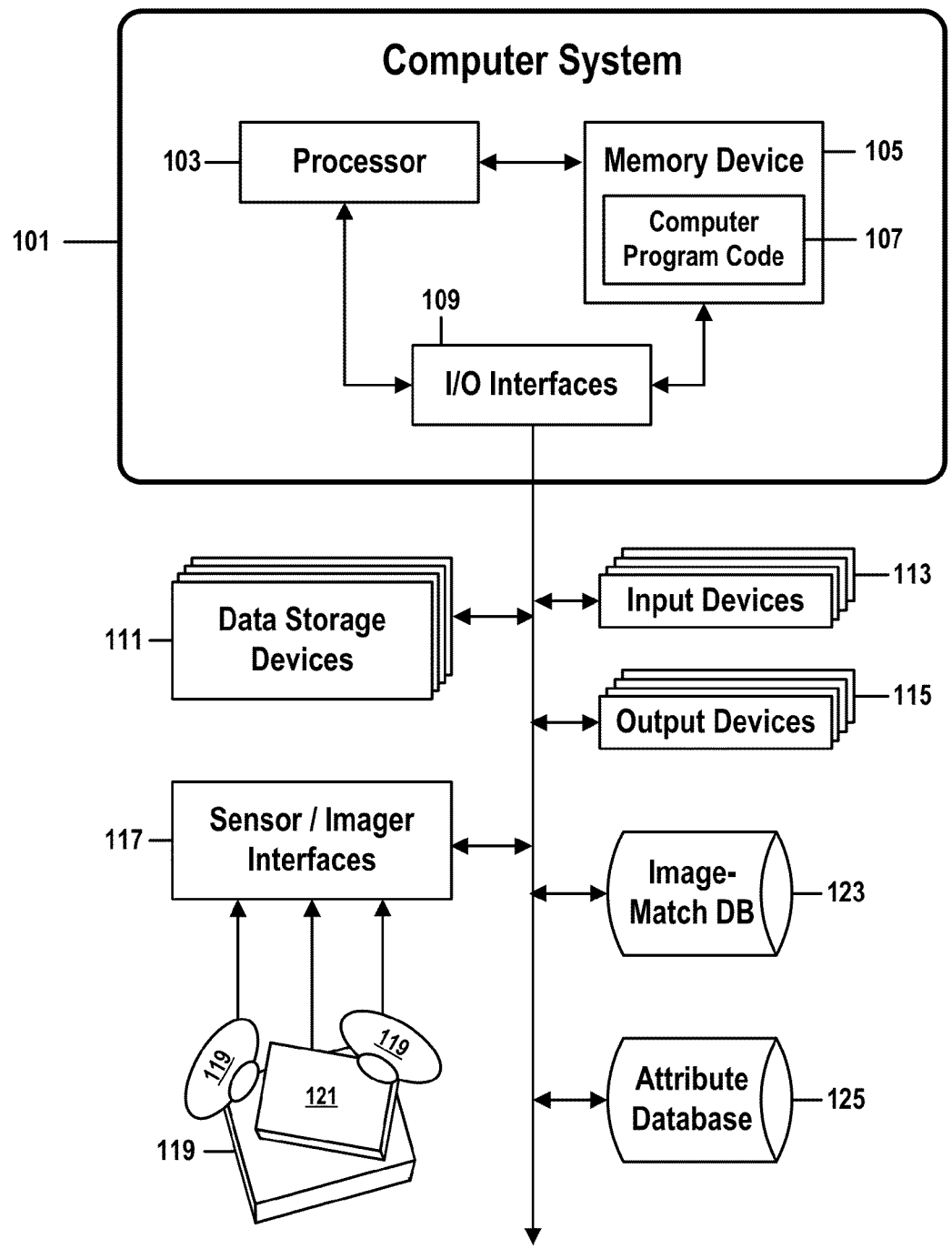
FIG. 1 shows a structure of a computerized system and computer program code that may be used to implement systems and methods for automated object identification and processing based on digital imaging and physical attributes in accordance with embodiments of the present invention.

Embodiments of the present invention provide a way to automatically identify a product or other object that cannot be identified in an automated production environment by conventional means, such as by an optical character reader or a machine-vision mechanism. Embodiments may then use this information to identify products similar to or related to the unidentified object, and then label the identified object with a machine-readable identifier that allows the object to be further processed. In some embodiments, the machine-readable identifier may associate the object with one or more of the similar or related products and the further processing may be performed as a function of this association.

An object may be unidentifiable because it is not labeled or marked with an expected identifier, such as an ISBN (International Standard Book Number), EAN (European Article Number) or IAN (International Article Number), UPC (Universal Product Code) bar code, or QR (Quick Response) two-dimensional bar code or RFID. An object may also be unidentifiable because it is labeled with a valid identifier that is obfuscated or damaged, or because the automated production environment is not equipped with a means to read or interpret the particular type of labeled code.

As will be described below, when an automated system fails to identify an object for any of these reasons, an embodiment of the present invention may generate a unique code and associate that code with the object for at least a duration of time during which the embodiment is active. The embodiment may further associate a digital image of the object with the generated code or with a set of measured or observed physical attributes of the object, such as the object's size, shape, color, or weight. This unique code may be used to track the object or to coordinate other information associated with the object at least until the object is positively identified.

The identification effort then proceeds through a series of identification steps that may comprise a combination of: searching for a machine-readable code in a digital image of the object; attempting to identify the object by means of an image-matching function that may match, to some extent, the digital image of the object against images of known objects stored in an image database; and attempting to identify the object by matching a combination of its physical attributes against an analogous combination of physical attributes associated with known objects.

Once the object is identified, that identification will be known as its "species." Although one species may identify many individual objects, each of those individuals may be identified by only one species. For example, a book with a unique combination of title, author, binding, publisher, publication date, and edition might be uniquely identified by an ISBN number. That same number would identify every copy of that book, and each copy would be considered an individual member of a species associated with that ISBN number.

Once an object's species is identified, some embodiments will then attempt to identify "related" species. The exact definition of relatedness, as used here, is implementation-dependent, but two species are generally related if they identify objects that do not differ in a way that would prevent one from being substituted for the other in a desired application.

For example, if a book is identified as having a first ISBN number (or as being an individual of a first species), the present invention might consider a subsequent printing of the same book, identified by a second ISBN number, to be a related species. If a customer expressly offers to purchase books of the related species, but will accept earlier printings of the same book, labeling an earlier edition of the book with the second (related-species) ISBN number might facilitate a downstream business rule that ultimately allows that book to be sold to the customer despite the book's failure to exactly match the customer's request. In other cases, a downstream business rule may identify that book, as the related species in a subsequent offering to customers. In other words, labeling an object of one species with an identifier of a related species may increase that object's marketability or value.

Once an embodiment successfully labels a previously unidentified object with a machine-readable label that identifies at least one of the object's true species and an acceptable related species, a similar methodology may be used to implement other types of downstream business rules. A rule may, for example, direct that the object, having no marketable related species, be discarded.

In some embodiments, once an object is identified and labeled, the embodiment may then use information associated with that identification to update an image database that stores a digital image of the identified object. Such information might, for example, include an additional digital image or a physical attribute of the object that was initially captured by the embodiment during its identification procedure.

Thus, embodiments of the present invention may be used as a way to automatically update, fine-tune, or optimize an image-matching system based on the embodiment's novel analysis of empirical measurements. Some embodiments may, in a similar way, automatically update, fine-tune, or optimize a product-attribute database that correlates objects with known combinations of physical attributes.

Figure 2:
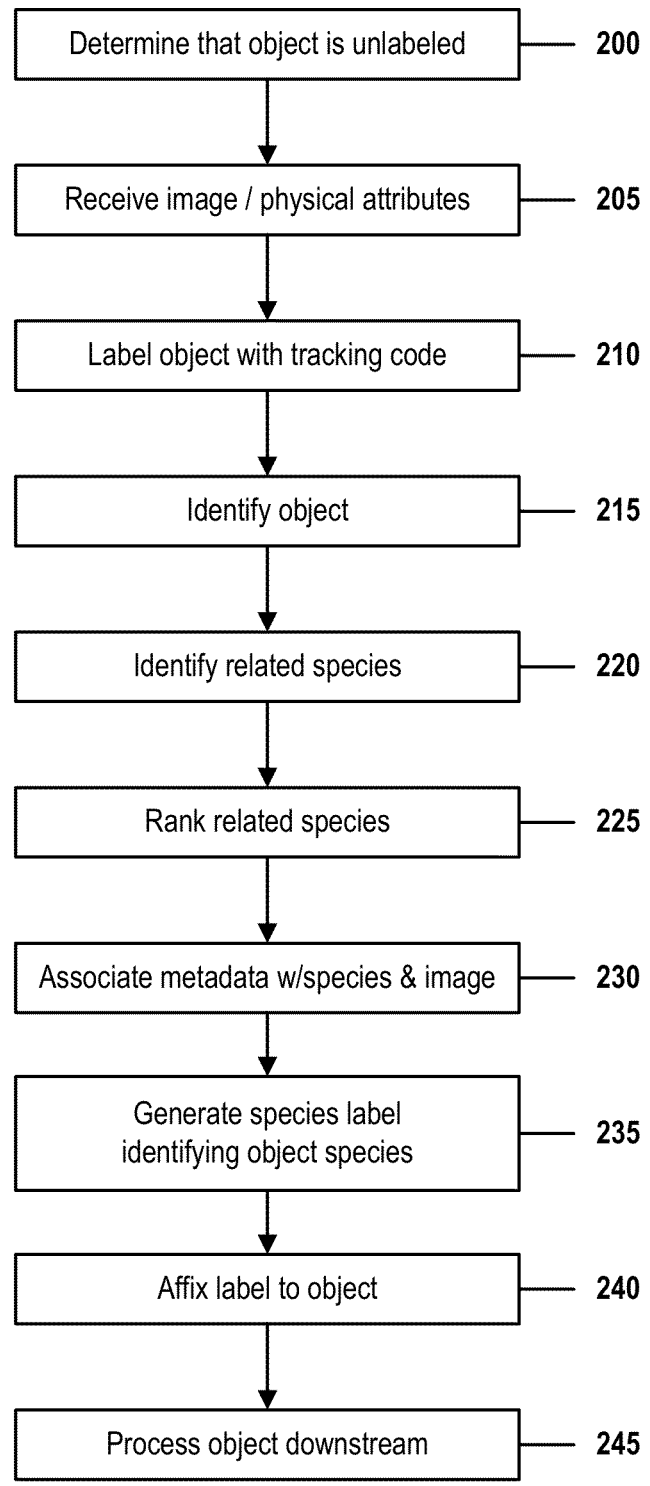
FIG. 2 is a flow chart that shows a method for automated object identification and processing based on digital imaging and physical attributes in accordance with embodiments of the present invention.
Figure 3:
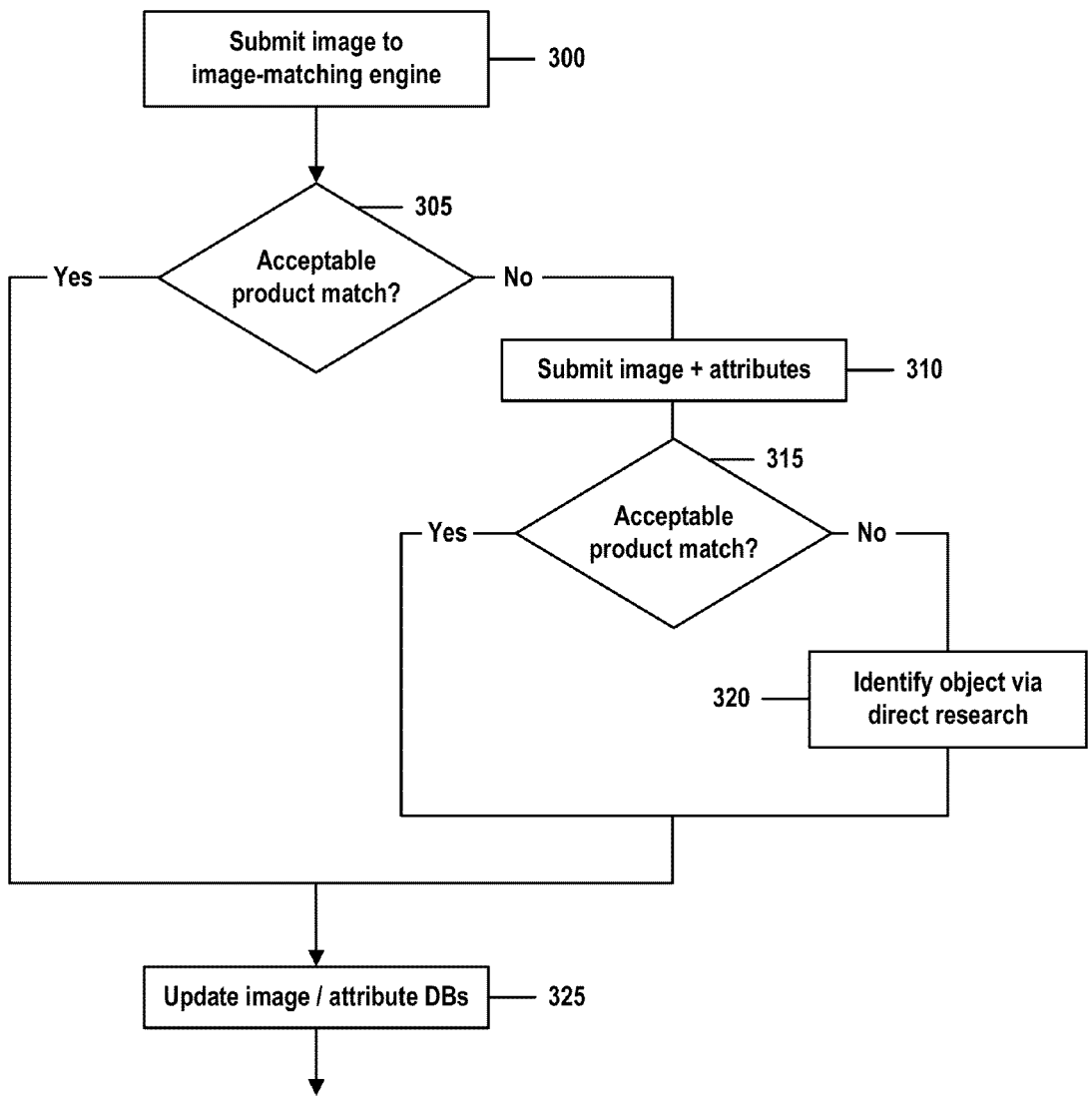
FIG. 3 is a flow chart that illustrates in greater detail steps of a method of FIG. 2 for identifying an unknown object in accordance with embodiments of the present invention.

FIGS. 1-3 below describe more general embodiments of this invention with greater detail and precision. The descriptions above and below are presented to enable a person of ordinary skill in the art to make and use the embodiments of the present invention. Descriptions of specific devices, techniques, and applications may be provided only as examples. Various modifications to the examples described herein will be readily apparent to those of ordinary skill in the art, and the general principles defined herein may be applied to other examples and applications without departing from the spirit and scope of the various embodiments. In some cases, for examples, steps of a method may be performed in a different order, a step may be omitted, or two or more steps may be combined, so long as doing so does not fundamentally alter a novel element of the present invention. Thus, the various embodiments are not intended to be limited to the examples described herein and shown, but are to be accorded the scope consistent with the claims.

FIG. 1 shows a structure of a computerized system and computer program code that may be used to implement systems and methods for automated object identification and processing based on digital imaging and physical attributes in accordance with embodiments of the present invention. FIG. 1 identifies objects 101-125.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for automated object identification and processing based on digital imaging and physical attributes in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for automated object identification and processing based on digital imaging and physical attributes.

Any of the components of the present invention could be created, integrated, hosted, maintained, deployed, managed, serviced, supported, etc. by a service provider who offers to facilitate a method for automated object identification and processing based on digital imaging and physical attributes. Thus the present invention discloses a process for deploying or integrating computing infrastructure, comprising integrating computer-readable code into the computer system 101, wherein the code in combination with the computer system 101 is capable of performing a method for automated object identification and processing based on digital imaging and physical attributes.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for automated object identification and processing based on digital imaging and physical attributes may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers or through an automated API interface to channel data. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for automated object identification and processing based on digital imaging and physical attributes is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

The computer system 101 may be further connected, via a direct connection, a wired or wireless network, a virtualized computer infrastructure (such as a cloud-computing platform), or any other communications or interface mechanism 117 known to those skilled in the art to one or more sensor/imaging input devices 119. These devices 119 may, as described above, include a digital camera and one or more devices capable of measuring a physical attribute of an unidentified object 121. A scale 119, for example, might measure a weight of the object 121, a reflectance meter 119 might measure the shininess of the object 121, and a specialized imager array 119 might determine a linear height, width, depth, and the geometric shape of the object 121. The digital camera 119 might capture a digital image of the object 121 when the object is moved into the range of the camera 119, as determined by a motion detector. This movement might be caused by movement of the object 121 on an assembly line or conveyor, by the placement of the object 121 in a specified location or orientation by a robotic or other automated mechanism, or by other means known in the art. In some embodiments, the object 121 might be stationary and a relative movement may be a result of a camera or other sensor instead moving toward the fixed position of the object 121.

In all cases, the devices 119, when required by an embodiment of the present invention will measure, image, detect, or otherwise gather information about object 121, and transmit it to interface 117, where it is aggregated, stored, formatted, or otherwise maintained, and forwarded to the computer system 101 when requested.

The computer system 101 may be further connected, via similar means, to an image-matching database, function, or other mechanism, and to an attributes-matching database, function, or other mechanism. The image-matching function incorporates or accesses an image database 123 of product images, each of which shows a known product or other type of object and each of which may be associated with metadata that provides identifying and related information about the known object such as a book's ISBN number. The image-matching function has the ability to determine whether a submitted image of an unknown object is sufficiently similar to one of its stored images of known objects to imply that the unknown object matches the known object. In some embodiments this determination may be performed as a function of match scores returned by the image-matching function, where a degree of similarity may be a function of a value of a returned stored image's match score. In one example, an acceptable degree of similarity of a returned stored image may be presumed when that returned image's match score exceeds a threshold.

The attributes-matching function incorporates an attributes database 125 of product-attribute entries, each of which associates a known product or other type of object with one or more physical attributes of that object. Similar to the way the image-matching function may identify an object depicted in a digital image, the attributes-matching function may identify an object by matching a submitted set of attributes of that unknown object to a stored set of attributes associated with a known object. As with the image-matching database 123, an entry stored in the attributes database 125 may be further associated with other types of metadata, including one or more physical attributes, sales, financial, marketing, and other types of business data, that are related to the unknown object or to the known object associated by the stored entry.

Embodiments of the present invention may be implemented as a method performed by a processor of a computer system, as a computer program product, as a computer system, or as a processor-performed process or service for supporting computer infrastructure.

FIG. 2 is a flow chart that shows a method for automated object identification and processing based on digital imaging and physical attributes in accordance with embodiments of the present invention. FIG. 2 shows steps 200-245.

In step 200, a computerized object-identification system, as described in FIG. 1, receives information that an object 121 needs to be identified. This may occur, for example, when an object 121 being processed in a materials-handling, line-assembly, or production environment cannot be automatically identified by expected means. This can occur if the object 121 is not labeled with a machine-readable identifier, such as a bar code or ISBN number, or if such an identifier is obscured or damaged. It may also occur if a materials-handling identification module is not configured to read a type of machine-readable identifier that has been used to identify an object. A system that is designed to read conventional one-dimensional bar codes may, for example, fail to identify a product packaged in a carton labeled only with a QR code.

Such a failure to identify may result in the materials-handling system deeming the object 121 to be unidentified and forwarding that information to an object-identification system that operates in accordance with embodiments of the present invention.

In step 205, the object-identification system (which will be hearafter referred to as "the system"), in response to receiving notice that the object 121 has not been identified, requests and receives additional information.

This information may include a digital photograph of the object 121 that is captured by a digital camera 119 or other digital imaging device or sensor 119 and forwarded to the system through an interface 117. The information may further include a set of physical attributes of object 121, such as its weight, one or more linear dimensions, its reflectance, or its shape. These physical attributes may be received by the system from one or more sensors 119 through interface 117.

In one example, a materials-handling system may determine that an object 121 moving along a conveyor belt, or other automated material-handling mechanism, is not labeled with a machine-readable code that uniquely identifies the item, is labeled with a code that cannot be accurately read by the materials-handling system's machine-vision reader or bar-code scanner, or is not labeled with a code at all. In such a case, the materials-handling system captures a digital image of the object 121 that it deems sufficient to identify the item and forwards that image to the object-identification system of the present invention or of a third party.

This forwarded image may comprise, as metadata, a unique tracking code that, in subsequent steps, will allow the object 121 to be located or that will allow tracking of the object 121 to be performed by the materials-handling system or by the object-identification system of the present invention.

In some embodiments, this tracking code may instead be generated by the object-identification system itself in response to being notified that the object 121 cannot be identified. In this latter case, the object-identification system would then add the tracking code to the digital image as metadata.

In all cases, the tracking code is a unique identifier that specifically identifies the physical object 121 and is not necessarily related to a product species or class to which the object 121 may be found to belong.

In step 210, a labeling device generates a machine-readable tracking label and physically attaches the label to the object 121. This label displays the unique tracking code generated above in a machine-readable form that may be read by a machine-vision module, a barcode scanner, or other automated reader comprised by the object-identification system or by the materials-handling system. By detecting and reading this label, the object- identification system or materials-handling system can determine a location and state of the object 121 at any time in the materials-handling process, regardless of whether a project species of the object 121 has been identified.

As described above, a machine-readable label may comprise any combination of technologies known to those skilled in the art in order to label the object 121. Such technologies, may, for example, comprise a bar code, a QR code, a machine-readable ISBN or EAN number, or a passive or active RFID (radio-frequency identifier) tag.

Some embodiments may omit step 210 or may be otherwise configured as to make step 210 redundant or unnecessary. In such embodiments, rather than first labeling an unidentified object 121 with a first tracking label prior to identification of the object 121's species or related species, and then labeling the object 121 with a second species label after identification, an object-identification system may instead label the object 121 only once.

In such a case, the single machine-readable label may serve the functions of both a tracking label and a species label, by first allowing the object 121 to be tracked and located within a materials-handling environment before a species of the object 121, or a species related to the object 121's actual species, is identified; and by then, after the object 121's species or related species is identified, providing machine-readable species-identifying information to the materials-handling system that allow business rules to manage the object 121's downstream processing.

Furthermore, in cases in which an object 121 cannot be identified by any of the means of the method of FIG. 3, this single label may be used to identify a fact that the object 121 is unidentified and, in effect, cannot be associated with an actual species or a related species. The functionality and usefulness of the present invention would not be compromised in such a case because downstream rules could be installed that make valid business decisions based on a finding of an unidentifiable object 121. A used-product distributor might, for example, implement a business rule that discards any object 121 that cannot be identified by conventional means, or offers the object 121 for bulk sale to a liquidator.

Finally, in implementations in which unidentified object 121 has been pre-labeled by a user before determining if the item is identifiable, or is otherwise already labeled with a machine-readable identifier that allows the object 121 to be located or tracked, embodiments of the present invention may omit a labeling step before or after receiving object information and instead use the pre-existing label to track, locate, characterize, embed metadata or otherwise manage the object 121. Such a case may occur if, for example, object 121 is labeled with a machine-readable code that cannot be recognized or cannot be used by the materials-handling system, such as a case in which a materials-handling system that identifies books by ISBN numbers encounters a package that is labeled with a bar code and an EAN number. In other embodiments, a component of a materials-handling system may label every object, or every object not already so labeled, with a machine-readable label, such that an unidentified object 121 is already associated with a label when it is first forwarded to an embodiment of the present invention. In such cases, the embodiment may not incur additional expense of generating an affixing another label to the object 121.

This multiple functionality may be implemented by means of associating various types of metadata with the single label or tag affixed to, or otherwise associated with, the object 121. This metadata may be derived from an image database or attribute database that has already stored characteristics of object 121s that belong to an actual species or related species. This metadata may also be derived from physical attributes or visual properties of the actual object 121, received from a digital camera or sensor 119. In some implementations, the metadata may be derived from a variety of extrinsic and internal sources, or may be inferred from patterns of data derived from multiple sources.

In short, the digital image or physical attributes of the object 121 received in step 205, one or more digital images stored in image database 123, one or more sets of physical attributes stored in attribute database 123, extrinsic sources referenced in step 320 of FIG. 3, and the tracking or species labels may all be updated at any time with metadata derived from any of these other sources. In this way, the overall object-identification system of the present invention, and corresponding components that interact with the object-identification system, may be continuously updated as a function of empirical data derived during operation of the object-identification system.

In step 215, the object-identification system identifies a species of the unidentified object 121. This species, as described above, identifies one or more known items that, according to implementation-dependent criteria, are sufficiently close matches to the object 121. A choice of parameters that may be used to identify such a species may be implementation-dependent, but in all cases, a species should identify object 121 with enough specificity to allow subsequent object-processing business rules to determine a desired procedure for processing the product downstream.

For example, in our ongoing example, in which a used book-distributor's automated materials-handling system processes books transported by a conveyor, a book's identified species may be deemed sufficient to identify the book if that species identifies the book's title, author, publisher, publication date, binding, and edition. Such a species may be fully determined by an ISBN number that is printed on the book's cover or on a machine-readable label affixed to the book. If the automated materials-handling system determines that a book is identified by such an ISBN number, the materials-handling system may infer from that ISBN number species-specific characteristics of the book that determine operation of downstream business rules.

These rules might, for example, refer to the book's publication date and binding in order to direct the materials-handling system to offer the book on a particular Internet book reseller's sales venue that specializes in similar books, to return the book in inventory, or to discard the book as unsellable.

In step 220, the object-identification identifies one or more related species that are related to the identified, actual, species of the object 121. As described above, the exact definition of relatedness, as used here, may be implementation-dependent, with two species being deemed to be related if they identify objects that do not differ in a way that would prevent one from being substituted for the other in a desired application.

In step 225, the related species identified in step 220 are ranked by one or more desired characteristics. Desired characteristics may include any combination of factors like price, publication date, or binding, that are deemed to be relevant to a downstream business rule or to an other business objective.

In some embodiments, this ranking may be performed as a function of a business rule that may operate prior to affixing a label to object 121. The related species may, for example, be evaluated or ranked as a business-rule function of a combination of business, financial, technical, or marketing-related factors, such as salability or marketability of a related species of object, an inventory position or current or projected inventory level of a species, or a number of sales offers and prices of sales offers of a species. In such cases, species may be ranked, accepted, or selected to be associated with the unidentified object 121 so as to optimize the value or usefulness of the unidentified object 121.

If, for example, a disc-distributor plans to offer an inventory of DVD movies to a low-price retailer, two desired characteristics may be each disc's shipping date and its selection of bonus features. In such an example, if an actual species of an object 121 identifies the object 121 as a 2009 reissue of a 2006 Academy Award-wining film, then the object-identification system may in step 220, identify three other related species that each identify a disc that contains the same film, but which was released earlier or later than the actual species disc, and with a different combination of bonus features. If the low-price retailer or other customer expresses a desire to purchase a more recent 2012 species of the disc, but not specify that this 2012 species is the only release of the movie it is willing to purchase, then the disc-distributor's business rules may allow the actual species 121 to be treated as being interchangeable with the retailer's requested species of disc.

In step 230, additional information associated with the actual species of the now-identified object 121 or with the highest-ranking related species selected in step 225 may be associated with the digital image received in step 205. In addition, other information gathered during steps of the methods of FIGS. 2-3 may be similarly associated.

Such information might include: physical attributes of object 121, such as the object's weight or dimensions; physical attributes of one or more highest- or higher-ranked related species; or non-physical characteristics or attributes of either the actual object or of one or more related species. These non-physical characteristics or attributes might include, but are not limited to, a sales rank, a current inventory level, a target inventory level, or an identification of a source or destination.

Some or all of this information may be associated with or embedded into the digital image received in step 205, or may be associated with the affixed label as metadata, and may later be retrieved by a business rule that determines how to process the object 121. It may similarly be embedded into one or more other digital images that are used by the image-matching function or that are stored in an image database 123, or may be used to update the attribute database 125. In this way, certain embodiments of the present invention may use its identification results to automatically update an image-matching tool or an image or attributes database. This automated updating may allow the object-identification system to learn from each identification and continuously optimize its operation and efficiency as a result. This may occur, for example, when an acceptable match between a known item and the unknown item is not found. In such a case, the digital image of the unknown item may be associated with metadata associated with the actual item to which the image belongs. The image, together with the now identifying metadata, may then be used to update the image-match process.

In step 235, the object-identification system directs a label-making apparatus to generate a "species" label that displays a machine-readable identifier of a related species ranked highest in step 225. In the preceding example, if the low-price retailer generally specifies titles with later release dates, but will not reject an offered disc that has an earlier release date, then a related species that has a latest release date might be ranked higher than earlier-released related species.

In some embodiments, the species label may specify or associate with both the actual species of object 121 and the highest-ranked related species that is deemed to be related to the object's actual species by a method of step 225. In other embodiments, the species label may contain other information, such as a physical attribute of the actual or related species or a non-physical characteristic or attribute of the actual or related species. If, for example, the highest-ranking species has been earmarked as being reserved for a particular customer, that customer's Customer Code may be imprinted on the species label in a machine-readable format. Various embodiments may place any combination of such information on the species label.

As in step 210, the machine-readable species label may be generated by any combination of technologies known to those skilled in the art in order to label the object 121. Such technologies, may, for example, comprise a bar code, a QR code, a machine-readable ISBN or EAN number, or a passive or active RFID (radio-frequency identifier) tag.

Although FIG. 2 shows the generation and application of the species label occurring after the related species are ranked in step 225, the label may be created and applied at other points in the method of FIG. 2. In some embodiments, for example, the label may be created and applied at the point of step 210, in effect combining the tracking label of step 210 and the species label of steps 230 and 235 into a single machine-readable label that uniquely identifies object 121. As described above in step 210, embodiments that affix only a single label to object 121 may rely upon that label throughout the entire method of the present invention to track the location of the object, to allow optical or other types of readers to identify a species or related species of the object, and to govern an operation of a downstream business rule.

In other embodiments, the time at which a single label is generated and affixed to object 121 may depend upon determinations made by the object-identification system. In one example, an embodiment may determine when to label an unidentified object 121 as soon as it is determined that the object 121 is identified and must be processed by the embodiment; it may label the object 121 when an identification of the object's actual species or related species is confirmed; or it may label the object when the embodiment determines that the object cannot be identified by a method of FIG. 3.

Other embodiments may include other variations in the timing or sequencing of the labeling step not described above. In all cases, however, an object 121 may be labeled at whatever step is deemed to most efficiently facilitate a useful interface between the object-identification system of the present invention and other materials-handling modules with which the present invention interoperates.

In step 240, the species label is affixed or otherwise associated with the object 121, so that it may subsequently used to identify that object 121 during downstream processing.

In step 245, the object-identification system returns control to the standard materials-handling or other automated object-processing system. Downstream business rules will now manage the further processing or disposition of object 121, and these rules may at least in part be governed by the species and associated information displayed on the species label. In some cases, a business rule may further access metadata associated with information specified on the species label and stored in the image database 123, the attribute database 125, or in an other repository of product information. As described above, an operation of such a business rule may depend on a value of such metadata.

The identification procedure of step 215 is described in greater detail in FIG. 3.

In an exemplary embodiment of the present invention may process an unidentified object 121 by means of an object-identification system that supports a used book-distribution warehouse. This warehouse may already be outfitted with a materials-handling system that includes:
- an automated conveyor mechanism that transports the object 121 between object 121-processing workstations
- automated sweepers or diverters that direct the object 121 to desired locations or routes of an automated material-handling system
- at least one digital camera 119 for photographing the object 121
- a scale 119 that records, stores, or forwards the object 121's weight
- an object-dimensioning apparatus 119, such as a laser, digital camera, or light curtain, that identifies the object 121's physical dimensions
- one or more movement-detection sensor 119s that determine when the object 121 is within range of a sensor 119, digital camera 119, scale 119, or other sensing mechanism
- a code-tamping apparatus that physically applies a machine-readable identifying code to an object 121
- code scanners that determine the presence of the object 121 by reading the identifying code applied to the object 121.

The movement sensors may trigger at least one digital camera 119 to detect and read any visible product codes imprinted on the surface of the object 121, such as a bar code or a QR code.

Initially, if a sensor 119 detects and reads a code that may be deemed sufficient to identify the object 121, this identification may trigger a business rule that further associates metadata known to be associated with the identified object 121. Such metadata may include a combination of the object's physical attributes, such as its name or title, its sales history, a current inventory level, its value, a sales forecast, a target inventory level, or anticipated customer demand. Other triggered business rules may determine ways in which the automated material-handling system further interacts with the object 121, as described below.

If a code is not detected, not read, or is inadequate to sufficiently identify the object 121, the digital camera 119 captures a digital image of the object 121, with the possible assistance of other elements of the system, such as the conveyor, the motion sensor 119, or other components of the material-handling system. The embodiment automatically submits the image to an image-matching function that, according to means that may be known to those skilled in the art, searches for comparable images of known items in an image database 123. Retrieved match results, if any, are evaluated and, if a close enough match is found, the object 121 is deemed to be identified as one or more of the known items and the business rules triggered.

The image-matching function may be performed by hardware or software operated or provided by another party. The embodiment may automatically submit the image to the image matching mechanism or function as a message containing the image and the unique, embodiment-generated, machine-readable identifying code applied to or associated with the object 121 by the embodiment. In some cases, the embodiment may, in response to sending the message, receive from imaging-matching function a response that identifies a species of the object 121, such as an ISBN and the unique, generated, machine-readable identifying code, or a failure-to-identify message that contains the unique, generated, machine-readable identifying code and an implementation-dependent failure code.

If this step fails to identify the object 121, a similar identification attempt may be initiated by further capturing physical attributes of the unidentified object 121, via the sensors 119, scale 119, or other known mechanisms, and by then forwarding some or all of those attributes to an attributes database 125 or other attributes-matching mechanism or function. In one example, an embodiment may attempt to match an unidentified book by measuring the book's linear dimensions, weight, and color, and then submitting those attributes, along with the generated, machine-readable identifying code, to the attributes-matching function.

If an acceptable match is found, the embodiment may, in response to sending the message, receive from attributes-matching function a response that identifies a species of the object 121, such as an ISBN and the unique, generated, machine-readable identifying code, or a failure-to-identify message that contains the unique, generated, machine-readable identifying code and an implementation-dependent failure code.

In some embodiments, variations of this attributes-matching function may be performed in order to attempt to identify the object as a function of different subsets of a set of empirically known, measured attributes. In an other variation, an identification may be attempted by submitting both the digital image and some or all of the measured attributes to a third-party database, image-matching, or other type of matching system capable of considering image and attributes.

In all cases, once the unknown object 121 is adequately matched, via image, attributes, or both, to a known entry in either the image database 123 or the attributes database 125, the embodiment deems the object 121 to have been identified and triggers the business rules to enable subsequent processing. Identifying metadata associated with the identified object may be associated with the captured image, with the affixed label, or with the matched image stored in the image database 123, and the image-matching mechanism or function may then be updated to incorporate any new information identified during the identification process.

During the embodiment's identification procedure, after determining that the object 121 will need to be identified, the embodiment will generate a unique, machine-readable code, formatted in a distinct manner, such as a bar code or RFID tag, and will physically apply, affix, attach, superimpose, or otherwise associate the code with the object 121. This code will follow the object throughout the identification procedure, allowing the embodiment to uniquely identify or locate that single physical, unknown object 121. In this current example, that unique code may be physically applied to the object 121 by the code-tamping apparatus.

Once the unique species of the object has been identified through any of these means, the embodiment may further identify one or more related species. The embodiment uses implementation-dependent business rules to determine which related species to select. If, for example, a business desires to sell lower-cost products, the system may select a related species that is associated with a lowest selling cost.

The system then generates a final identifier tag and affixes it to the object 121. This final tag may identify the actual species of the object 121, one or more related species, or both. Later steps in the material-handling process, as governed by triggered business rules, may operate or make decisions as a function of the species identified on the final tag. If, for example, the final tag identifies a related species of book that has a hardcover binding, then subsequent book-processing functions may direct the book 121 to a climate-controlled storage area optimized for hardcovers or may forward inventory information for the book 121 to a distribution channel that handles hardcovers.

At each step, of this process, accumulated data associated with the object 121 may be collected, aggregated, organized, archived, and later used to generate statistical data that may facilitate statistical tuning of the business rules or technical parameters of a component of the embodiment or of the material-handling system.

Although most of the examples described in this document refer to book-processing facilities, embodiments of the present invention should not be construed to be so limited. The present invention may be applied to any sort of materials-handling application that must process objects: that are improperly labeled, unlabeled, or otherwise difficult to identify with a standard machine-vision function; to which a machine-readable label or tag may be affixed by automated means; that may be physically characterized by sensors in a materials-handling system or photographed by a digital camera; and that may be processed, distributed, or disposed of by known business rules that operate as a function of the identity of the object.

FIG. 3 is a flow chart that illustrates in greater detail steps of a method of FIG. 2 for identifying an unknown object in accordance with embodiments of the present invention. FIG. 3 shows steps 300-325.

FIG. 3 shows in greater detail the object-identification step 215 of FIG. 2, in which an object-identification system acts in accordance with embodiments of the present invention to identify an actual species of an as-yet-unidentified object 121.

In step 300, the object-identification system attempts to identify object 121 by submitting the image of object 121 received in step 205 to an image-matching system. Here, the image-matching system uses means known in the art to attempt a pattern-based, or other graphical method to match characteristics of the submitted image to those of images stored in an image base 123. Because each image stored in the image base 123 is associated with a known object, a successful match might successfully identify an actual species of object 121. In response to the submission, the image-matching function will return either a failure-to-match message or a set of one or more possible matches.

In step 305, the object-identification system determines whether the image-matching system has returned an acceptable image match in response to the image submitted in step 305. If not, the method of FIG. 3 continues with steps 310-325, but if an acceptable image match is found, the method jumps directly to step 325.

In some embodiments, the object-identification system of the present invention evaluates each image-match returned by the image-matching system when determining in step 325 whether any of the returned matches may be deemed to be acceptable. In some cases, this evaluation may be facilitated by an image-match score returned by the image-matching system or determined by the object-identification system itself. Here, an image-match score may indicate a degree of match, with, for example, a higher match-score suggesting that a particular returned image is a better match for the submitted image.

In some embodiments, the object-identification system may use a more nuanced analysis in order to determine whether a particular returned image match may be deemed to be acceptable. If, for example, one retrieved image is associated with a very high match score, this may indicate that the retrieved and submitted images both depict a book, record, or disc that has a nearly identical cover. However, if an additional match parameter maintained by the object-identification system indicates a significant mismatch, this additional consideration may outweigh the high image-match score. Such a result may occur, for example, when a single-disc compact disc and a multi-disc box set have nearly identical covers, but significantly different weights.

Step 310 is performed when it is determined in step 305 that the image-matching function did not return an acceptable image match. Here, the object-identification system responds by adding a set of physical attributes of the object 121 to its identification query.

In some cases, a multi-media search for object 121's actual species may be conducted by requesting a coordinated search of both image database 123 and attributed database 125. In such cases, one or more external match engines may attempt to identify object 121 by considering both a visual match between the digital image of step 205 and images stored in the image database 123, and a data match between one or more physical attributes of object 121 measured or received in step 205 and analogous attributes stored in attributes database 125.

In some embodiments, this procedure may instead be performed in several steps. Upon determining that an acceptable image match was not received in step 305, the object-identification system next attempts to identify object 121 solely by submitting physical attributes to an attribute-matching function that searches attributed database 125. If this second attempt fails, only then would such an embodiment perform a more sophisticated search that attempts to match both images and attributes. Other combinations of search criteria are possible, some of which may augment graphical or physical-attribute search terms with other known characteristics of the as-yet-unidentified object 121.

In step 315, by means of a procedure analogous to that of step 305, the object-identification system of the present invention determines whether the external image- and attribute-matching systems have returned an acceptable match in response to the information submitted in step 310. If not, the method of FIG. 3 continues with step 302, but if an acceptable match is found, the method jumps directly to step 325.

As in step 305, an acceptable match may be determined as a function of one or more match scores returned by the image- and attribute-matching systems, and may be further determined by consideration of other factors and other considerations that may be used to improve an accuracy or precision of a suggested match.

In step 320, if none of the identification techniques of steps 300-315 have produced an acceptable identification of step 121, the object-identification system may turn over the identification procedure to an extrinsic process that searches external sources on the Internet, in proprietary literature, in business records of prior transactions, or in other known sources of product information.

Depending on implementation details of a particular embodiment, this extrinsic search may be performed automatically by means known to those skilled in the art, or may all or in part be performed via a manual search. At the conclusion of a manual search, an embodiment of the present invention may resume its automated operation. In one example, a manual search may comprise scanning the affixed product code, with which the taken image of the unidentified item is associated, and then initiating a search that incorporates all or part of the metadata related to the taken image. If further identifying metadata is discovered during the search, that further metadata might then be added to the image's metadata in order to more precisely identify the image. The now-identified image might then be used to update the image-matching process, and the now identified item would be further processed according to business rules.

If object 121 cannot be identified by any form of direct search in step 320, some embodiments may create a new species or select a default species and associate object 121 with that species until a more accurate identification can be made.

In step 325, the object-identification system, having identified a species of object 121 and associated that species with the tracking code associated with object 121 in step 210, may then use information associated with that identification to update reference sources that may be used in the future to identify other objects. These references may include image database 123, attributes database 125, or other extrinsic sources referenced in step 320.

Similarly, the object-identification may further add information gathered during the performance of a method of FIG. 3 as metadata to one or more digital images of object 121. In this way, embodiments of the present invention may be used to automatically update, fine-tune, or optimize components of the object-identification system, the materials-handling system, or related module.

In some embodiments, this metadata may then be used by downstream business rules to more accurately and precisely determine a best way to dispose of or otherwise process the now-identified object 121.

What is claimed is:

1. A computerized object-identification system comprising a processor, a memory coupled to the processor, an interface to an imaging device, a set of interfaces to a set of electronic sensors, and a computer-readable hardware storage device coupled to the processor, the storage device containing program code configured to be run by the processor via the memory to implement a method for automated object identification and processing based on at least one of a digital image of an object and a physical attribute of the object, the method comprising:

the computerized object-identification system receiving notice that the object has not been identified;
   the system receiving information that describes an unidentified object;
   the system identifying the object as a function of the received information;
   the system further identifying a set of related objects as a further function of the received information;
   the system ranking the related objects as a function of a value of a degree of similarity of each object of the set of related objects to the unidentified object, wherein a higher-ranked object of the set of related objects is more similar to the unidentified object than is a lower-ranked object of the set of related objects object;
   the system, at a time after the receiving notice, directing a labeling device to generate a unique machine-readable species label that associates the unidentified object with at least one species of object selected from a group comprising: an actual species of the unidentified object, a default species that indicates that the object cannot be identified, and a species of a highest-ranked related object of the set of related objects; and
   the system directing that the species label be affixed to the unidentified object such that a downstream business rule may determine how the object should be processed as a function of the species identified by the species label.

2. The system of claim 1, wherein the received information comprises a digital image of the unidentified object received from the imaging device, and wherein the identifying the object comprises:

the system submitting the digital image to an image-matching function;
   the system receiving, in response to the submitting, a set of match scores, wherein each score of the set of match scores identifies a degree of similarity between the submitted image and a stored image that is known to identify a known object, and wherein the degree of similarity is a function of a number of characteristics of the submitted image that each match an analogous characteristic of the known object;
   the system selecting a most acceptable known object of the received known objects, wherein the selecting is performed as a function of the received set of match scores; and
   the system identifying the unidentified object as being the most acceptable known object.

3. The system of claim 2, further comprising:
   the system directing the image-matching function to update itself as a function of the selecting the most acceptable known object.

4. The system of claim 1, wherein the received information comprises a set of physical attributes of the unidentified object, and wherein the identifying the object comprises:
   the system submitting a subset of the set of physical attributes to an attribute-matching function;
   the system receiving, in response to the submitting, a set of attribute matches, wherein each match of the set of attribute matches identifies a known object as a function of a degree of similarity between the submitted subset and a stored set of physical attributes that is known to identify the known object;
   the system selecting a most acceptable known object of the received known objects, wherein the selecting is performed as a function of the received set of attribute matches; and
   the system identifying the unidentified object as being the most acceptable known object.

5. The system of claim 4, further comprising:
   the system directing the attribute-matching function to update itself as a function of the selecting the most acceptable known object.

6. The system of claim 4,
   wherein the set of physical attributes are received from the set of electronic sensors;
   wherein each sensor of the set of electronic sensors is selected from a group comprising: a weight scale, a reflectance meter, a digital-imaging device, a laser, a light curtain, an optical character reader, and a digital scanner;
   wherein an attribute of the set of the physical attributes is selected from a group comprising: a weight, a mass, a linear dimension, a shape, a marking or other identifier, a color, a binding, a volume, a reflectance, a visual pattern, a texture, a trade-dress format or design, a title, a value, a cost, and a page count.

7. The system of claim 1, wherein the received information comprises a digital image of the unidentified object and a set of physical attributes of the unidentified object, and wherein the identifying the object comprises:
- the system submitting the digital image to an image-matching function and further submitting a subset of the set of physical attributes to an attribute-matching function;
- the system receiving, in response to the submitting and to the further submitting, one or more messages indicating that the image-matching function and the attribute-matching function failed to identify an acceptable known object associated with the submitted information;
- the system, in response to the one or more messages, requesting that an external search agency identify the unidentified object by searching extrinsic sources of information; and
- the system, in response to the requesting, receiving from the external search agency an identification of the unidentified object.

8. The system of claim 7, further comprising:
- the system directing the external search agency to update an extrinsic source of information as a function of the identification of the unidentified object.

9. The system of claim 1, wherein the correlated characteristic is selected from a group comprising a sales rank, a value, a current inventory level, a target inventory level, a publication date, a manufacture date, a title, an edition, an author, a number of sales offers received through at least one sale channel, a range of values of sales offers received through at least one sale channel, and a customer requirement.

10. The system of claim 1, wherein the identifying comprises receiving an identification of a set of candidate objects and a set of match scores, wherein each match score indicates a degree of similarity between the unidentified object and one candidate object of the set of candidate objects, and wherein the identifying is performed as a function of the set of match scores.

11. The system of claim 1, further comprising:
- the system associating the digital image with metadata that is associated with the species of object identified by the species label, wherein the metadata is selected from a group comprising: a title, an author, a number of sales offers received through at least one sale channel, a range of values of sales offers received through at least one sale channel, an inventory level, and a customer requirement.

12. The system of claim 1, wherein the ranking is performed as a further function of a business priority.

13. The system of claim 1, wherein the downstream business rule is selected from a group comprising: directing the object to an area of inventory, offering the object to a customer, and discarding the object.

14. A method for automated object identification and processing based on at least one of a digital image of an object and a physical attribute of the object, the method comprising:
- a computerized object-identification system receiving notice that the object has not been identified;
- the system receiving information that describes an unidentified object;
- the system identifying the object as a function of the received information;
- the system further identifying a set of related objects as a further function of the received information;
- the system ranking the related objects as a function of a value of a degree of similarity of each object of the set of related objects to the unidentified object, wherein a higher-ranked object of the set of related objects is more similar to the unidentified object than is a lower-ranked object of the set of related objects;
- the system, at a time after the receiving notice, directing a labeling device to generate a unique machine-readable species label that associates the unidentified object with at least one species of object selected from a group comprising: an actual species of the unidentified object, a default species that indicates that the object cannot be identified, and a species of a highest-ranked related object of the set of related objects; and
- the system directing that the species label be affixed to the unidentified object such that a downstream business rule may determine how the object should be processed as a function of the species identified by the species label.

15. The method of claim 14, wherein the received information comprises a digital image of the unidentified object received from the imaging device, and wherein the identifying the object comprises:
- the system submitting the digital image to an image-matching function;
- the system receiving, in response to the submitting, a set of match scores, wherein each score of the set of match scores identifies a degree of similarity between the submitted image and a stored image that is known to identify a known object, and wherein the degree of similarity is a function of a number of characteristics of the submitted image that each match an analogous characteristic of the known object;
- the system selecting a most acceptable known object of the received known objects, wherein the selecting is performed as a function of the received set of match scores; and
- the system identifying the unidentified object as being the most acceptable known object.

16. The method of claim 14, wherein the received information comprises a set of physical attributes of the unidentified object, and wherein the identifying the object comprises:
- the system submitting a subset of the set of physical attributes to an attribute-matching function;
- the system receiving, in response to the submitting, a set of attribute matches, wherein each match of the set of attribute matches identifies a known object as a function of a degree of similarity between the submitted subset and a stored set of physical attributes that is known to identify the known object;
- the system selecting a most acceptable known object of the received known objects, wherein the selecting is performed as a function of the received set of attribute matches; and
- the system identifying the unidentified object as being the most acceptable known object.

17. The method of claim 14, wherein the received information comprises a digital image of the unidentified object and a set of physical attributes of the unidentified object, and wherein the identifying the object comprises:
- the system submitting the digital image to an image-matching function and further submitting a subset of the set of physical attributes to an attribute-matching function;
- the system receiving, in response to the submitting and to the further submitting, one or more messages indicating that the image-matching function and the attribute-matching function failed to identify an acceptable known object associated with the submitted information;

the system, in response to the one or more messages, requesting that an external search agency identify the unidentified object by searching extrinsic sources of information; and the system, in response to the requesting, receiving from the external search agency an identification of the unidentified object.

18. A computer program product, comprising a computer-readable hardware storage device having a computer-readable program code stored therein, the program code configured to be executed by a computerized object-identification system comprising a processor, a memory coupled to the processor, an interface to an imaging device, a set of interfaces to a set of electronic sensors, and a computer-readable hardware storage device coupled to the processor, the storage device containing program code configured to be run by the processor via the memory to implement a method for automated object identification and processing based on at least one of a digital image of an object and a physical attribute of the object, the method comprising:

the computerized object-identification system receiving notice that the object has not been identified;

the system receiving information that describes an unidentified object;

the system identifying the object as a function of the received information;

the system further identifying a set of related objects as a further function of the received information;

the system ranking the related objects as a function of a value of a degree of similarity of each object of the set of related objects to the unidentified object, wherein a higher-ranked object of the set of related objects is more similar to the unidentified object than is a lower-ranked object of the set of related objects;

the system, at a time after the receiving notice, directing a labeling device to generate a unique machine-readable species label that associates the unidentified object with at least one species of object selected from a group comprising: an actual species of the unidentified object, a default species that indicates that the object cannot be identified, and a species of a highest-ranked related object of the set of related objects; and the system directing that the species label be affixed to the unidentified object such that a downstream business rule may determine how the object should be processed as a function of the species identified by the species label.

19. The computer program product of claim 18, wherein the received information comprises a digital image of the unidentified object received from the imaging device, and wherein the identifying the object comprises:

the system submitting the digital image to an image-matching function;

the system receiving, in response to the submitting, a set of match scores, wherein each score of the set of match scores identifies a degree of similarity between the submitted image and a stored image that is known to identify a known object, and wherein the degree of similarity is a function of a number of characteristics of the submitted image that each match an analogous characteristic of the known object;

the system selecting a most acceptable known object of the received known objects, wherein the selecting is performed as a function of the received set of match scores; and the system identifying the unidentified object as being the most acceptable known object.

20. The computer program product of claim 18, wherein the received information comprises a set of physical attributes of the unidentified object, and wherein the identifying the object comprises:

the system submitting a subset of the set of physical attributes to an attribute-matching function;

the system receiving, in response to the submitting, a set of attribute matches, wherein each match of the set of attribute matches identifies a known object as a function of a degree of similarity between the submitted subset and a stored set of physical attributes that is known to identify the known object;

the system selecting a most acceptable known object of the received known objects, wherein the selecting is performed as a function of the received set of attribute matches; and the system identifying the unidentified object as being the most acceptable known object.

21. The computer program product of claim 18, wherein the received information comprises a digital image of the unidentified object and a set of physical attributes of the unidentified object, and wherein the identifying the object comprises:

the system submitting the digital image to an image-matching function and further submitting a subset of the set of physical attributes to an attribute-matching function;

the system receiving, in response to the submitting and to the further submitting, one or more messages indicating that the image-matching function and the attribute-matching function failed to identify an acceptable known object associated with the submitted information;

the system, in response to the one or more messages, requesting that an external search agency identify the unidentified object by searching extrinsic sources of information; and the system, in response to the requesting, receiving from the external search agency an identification of the unidentified object.

* * * * *